US008501830B2

(12) United States Patent
Selman et al.

(10) Patent No.: US 8,501,830 B2
(45) Date of Patent: Aug. 6, 2013

(54) INK JET INK AND A METHOD OF INK JET PRINTING

(75) Inventors: Hartley David Selman, Bristol (GB); Graeme Edward Charles Beats, Wells (GB); Nigel Anthony Caiger, Woodkey Hole (GB); Andrew David Speirs, Melksham (GB); Stephen Paul Wilson, Shepton Mallet (GB)

(73) Assignee: Sun Chemical Corporation, Parsippany, NJ (US)

( * ) Notice: Subject to any disclaimer, the term of this patent is extended or adjusted under 35 U.S.C. 154(b) by 433 days.

(21) Appl. No.: 12/679,421

(22) PCT Filed: Sep. 15, 2008

(86) PCT No.: PCT/US2008/076374
§ 371 (c)(1),
(2), (4) Date: Jun. 28, 2010

(87) PCT Pub. No.: WO2009/045703
PCT Pub. Date: Apr. 9, 2009

(65) Prior Publication Data
US 2010/0285282 A1  Nov. 11, 2010

(30) Foreign Application Priority Data

Oct. 4, 2007  (GB) .................................. 0719464.0

(51) Int. Cl.
*C08F 2/50* (2006.01)
*C09D 11/02* (2006.01)
*C09D 11/10* (2006.01)

(52) U.S. Cl.
USPC .............. 522/182; 522/71; 522/74; 522/150; 522/153; 522/178; 522/909; 106/31.13; 106/31.6; 106/31.9; 427/508; 427/510; 427/511; 427/514

(58) Field of Classification Search
USPC ............ 522/71, 74, 150, 153, 178, 182, 908; 106/31.13, 31.6, 31.9; 427/50, 510, 511, 427/514
See application file for complete search history.

(56) References Cited

U.S. PATENT DOCUMENTS

| 4,207,155 | A  | * | 6/1980 | Martin et al. | .................... 522/14 |
| 8,039,093 | B2 | * | 10/2011 | Leenders et al. | ............ 428/195.1 |
| 8,133,936 | B2 | * | 3/2012 | Ward et al. | ..................... 523/160 |
| 2006/0134554 | A1 | * | 6/2006 | Ragnetti et al. | ................ 430/300 |
| 2008/0225063 | A1 | * | 9/2008 | Cohen et al. | ...................... 347/1 |
| 2008/0225099 | A1 | * | 9/2008 | Cohen et al. | .................. 347/102 |
| 2008/0316244 | A1 | * | 12/2008 | Lugassi et al. | .................. 347/16 |
| 2010/0272966 | A1 | * | 10/2010 | Gould | ........................ 428/195.1 |

FOREIGN PATENT DOCUMENTS

| EP | 1803784 A | 7/2007 |
| WO | WO2004106437 A | 12/2004 |
| WO | WO2006102524 A | 9/2006 |
| WO | WO2007045580 A | 4/2007 |
| WO | WO2007125273 A | 11/2007 |

OTHER PUBLICATIONS

International Search Report and Written Opinion issued for International Application No. PCT/US2007/076374, dated Dec. 11, 2008.

* cited by examiner

*Primary Examiner* — Sanza McClendon
(74) *Attorney, Agent, or Firm* — Kramer Levin Naftalis & Frankel LLP

(57) ABSTRACT

The invention describes a radiation-curable ink jet ink, which comprises at least 50% by weight of cyclic trimethylolpropane formal acrylate (CTFA), and further comprises a free-radical photoinitiator, and which is substantially free of volatile compounds.

19 Claims, No Drawings

INK JET INK AND A METHOD OF INK JET PRINTING

CROSS REFERENCE TO RELATED APPLICATIONS

This application is the United States national phase filing of the corresponding international application number PCT/US2007/076374, filed on Sep. 15, 2007, which claims priority to and benefit of GB Application No. 0719464.0, filed Oct. 4, 2007, which applications are hereby incorporated by reference in their entirety.

The invention relates to an ink jet ink, in particular, to a UV-curable ink jet ink, and to a method of ink jet printing.

Digital ink jet has become an established technology for producing full colour images on graphic display and other products on both rigid and flexible substrates. Due to commercial pressures, faster product printing speeds are often sought, requiring in turn UV jet inks which can be cured more rapidly. The majority of commercially available jet inks cure via a free-radical mechanism, but some cationic curing jet inks are now emerging.

A limitation of both free-radical and cationic curing inks is that some of the raw materials used in those inks, especially monomers, have high odour levels. That is especially true of UV-curable jet inks for use on flexible substrates, where high levels of more volatile, and often more odorous, monofunctional UV-curable monomers are often included. The odours from those monomers can persist after curing of the ink film, and may be perceived by the end user of the printed product. Whilst for some applications, for example outdoor graphics display, such an odour is not particularly detrimental, for other applications it limits the use of UV-curable jet ink printed product. Attempts have been made to mask odours with fragrances or to include a deodorising component to an ink but those methods have not entered widespread use for UV-curable ink jet inks.

In water based drop-on-demand jet inks the odour is generally kept low by using water as a vehicle in combination with high molecular weight resins. However, such water based ink jet inks are generally limited to printing on porous substrates such as paper.

Solvent based drop-on-demand and continuous ink jet inks may develop a high odour at the printing and drying stages as the volatile solvents evaporate from the ink. However, the solvents evaporate relatively rapidly and therefore the final end user does not experience a higher level of odour from the printed product. Nonetheless, the use of volatile organic solvents is associated with health and safety and environmental concerns. In oil based drop-on-demand jet inks the oils used are relatively low in odour but those inks are not suitable for use on non-porous substrates.

Hot melt drop-on-demand jet inks also have low odours, due to the absence of volatile components, but they are not suitable for achieving good adhesion and robust prints on non-porous substrates.

Some of the cationic curing UV-curable ink jet inks which have recently become available are relatively low in odour, although the photoinitiators used may cause higher odour, even after the ink is cured. However, their pigment and print head stability characteristics are not yet reliable, so in general they do not offer a solution to the need to print onto non-porous substrates with good adhesion.

There remains a need to provide a jet ink which has acceptable adhesion and acceptable cure speed and which has a low odour both at the printing stage and when used by the end user.

The invention provides a radiation-curable ink jet ink comprising at least 50% by weight of cyclic trimethylolpropane formal acrylate (CTFA), and a free-radical photoinitiator, and which is substantially free of volatile organic compounds.

CTFA has been known for use in ink jet inks but its use has been restricted by its perceived relatively high viscosity. That, coupled with the desire also to include in the ink monomers that have a high functionality and which can therefore provide improved cure speed and robustness but which are also necessarily of high viscosity, has limited its application in ink jet printing. However, the present inventors have surprisingly found that it is possible to formulate inks which have a viscosity which is low enough to meet the requirements of ink jet printing, cures at an acceptable rate and which has a low odour both as a liquid ink, and after curing. The cured inks have also in general been found to have acceptable performance and, in particular, acceptable flexibility and adhesion.

Preferably, the ink comprises at least 60%, advantageously at least 70%, more preferably at least 80% and in some cases at least 85% by weight of CTFA. In one embodiment the ink comprises no more than 95% by weight, optionally no more than 90% by weight of the CTFA.

The ink jet ink of the invention is substantially free of volatile organic compounds, that is, the ink contains less than 1% by weight of volatile organic compounds, preferably less than 0.5% and especially preferably less than 0.25% by weight of volatile organic compounds. The term "volatile organic compound" as used herein refers to any compound which is organic and which is liable to evaporate from either the liquid ink or the cured ink film during or after printing and curing. That term therefore encompasses the common volatile organic solvents including the lower alcohols such as methanol, ethanol and propanol, diethyl ether, halocarbons etc. The ink of the invention in one embodiment comprises less than 1% by weight of organic compounds having a boiling point of less than 170° C. at atmospheric pressure.

The term "polyfunctional monomer" as used herein refers to an ethylenically unsaturated monomer which has two or more functional groups which are capable of taking part in the curing reaction of the ink, for example acrylate or methacrylate groups. "Tri- or higher functional" is to be understood as referring to a monomer which has three or more functional groups which are capable of taking part in the radiation induced curing reaction, for example, acrylate or methacrylate groups.

UV-curable ink jet inks typically comprise at least one di- or higher functional monomer. Di- or higher functional monomers provide cross-links between polymer chains in the cured film and therefore increase robustness and strength of the cured ink. Di- or higher functional monomers also help to increase the cure speed of the ink. Generally the higher the functionality of a monomer, the more effective it is increasing the degree of cross-linking and increasing the cure speed. However, polyfunctional monomers are also associated with increased shrinkage of the ink upon curing, and can in that way reduce the adhesion to the substrate or cause distortion of the substrate.

The present inventors have found that it is possible to formulate inks comprising high levels of CFTA which can cure at an acceptable speed to produce cured ink films with acceptable robustness even in the absence of or with relatively low levels of di- or higher functional monomer(s). Accordingly, in a further aspect the invention provides a radiation-curable ink jet ink comprising at least 50% by weight of CTFA and a free radical photoinitiator and which comprises no more than 5% wt in total of di- or higher functional monomers. In that aspect, the ink preferably comprises no more than 3% by weight of di- or higher functional monomers and more preferably is substantially free, for example, comprises less than 1% by weight of di- or higher functional monomers. Preferably, in that aspect, the ink is also substantially free of volatile compounds, for example, it comprises less than 1% by weight of volatile compounds, for example, it comprises less than 1% by weight of volatile compounds.

In a separate embodiment, the ink does comprise a significant amount of one or more di- or higher functional monomers. The ink may, in particular, also comprise one or more difunctional monomers. The ink may comprise at least one tri- or higher functional monomer. The ink may comprise a penta- or hexafunctional monomer. In that embodiment, the ink preferably comprises no more than 25% of di- or higher functional monomer(s). Optionally, the ink comprises at least 1 wt %, more preferably from 5 to 25 wt %, especially preferably from 5 to 10 wt % of the tri- or higher functional monomer(s). The ink preferably comprises no more than 10% by weight of penta- or hexafunctional monomer(s). The ink may in some cases comprise up to 20% by weight of a dendritic polyfunctional (meth)acrylate monomer.

The ink may also comprise one or more monofunctional monomers in addition to the CTFA. However, those other monofunctional monomers, if present, preferably comprise no more than 40% by weight of the ink, and preferably less than 30% by weight of the ink.

The ink of the invention comprises a photoinitiator which initiates free-radical mediated curing of the ink. Suitable components curable by a free-radical mechanism include ethylenically unsaturated monomers and oligomers such as acrylate monomers and oligomers, and vinyl components such as N-vinyl pyrollidone, N-vinyl caprolactam, vinyl ethers and styrenes. Preferably, all of the curable components of the ink are curable by a free-radical mechanism but the invention also extends to inks which comprise a minor amount of cationically-curable components together with a cationic initiation system.

Suitable difunctional acrylate monomers include hexanediol diacrylate, polyethyleneglycol diacrylates (for example, tetraethyleneglycol diacrylate), dipropyleneglycol diacrylate, neopentylglycol diacrylate and propoxylated neopentyl glycol diacrylate.

Suitable trifunctional acrylate monomers include trimethylolpropane triacrylate, pentaerythritol triacrylate, tri(propylene glycol) triacrylate and ethoxylated trimethylolpropane triacrylate.

Bis(pentaerythritol)hexaacrylate is a suitable hexafunctional acrylate monomer.

Monofunctional acrylate monomers which may be used in the ink of the invention in addition to the CTFA include esters of acrylic acid, for example octyl acrylate, tridecyl acrylate, decyl acrylate, isobornyl acrylate, phenoxyethyl acrylate, tetrahydrofuryl acrylate, and 2-(2-ethoxyethoxy)ethylacrylate. Tridecyl acrylate is especially preferred.

Many other suitable mono and polyfunctional monomers will be known to the skilled person.

The inclusion in jet inks of a monomer comprising a higher alkyl group is known to give improved weatherability as compared to a similar ink not comprising a monomer having a higher alkyl group. The term "higher alkyl group" as used herein refers to any alkyl group, which may be linear or branched, which comprises 6 or more carbon atoms (not including carbon atoms present in the monomer which are not part of the alkyl group). The inclusion of a monomer comprising an aromatic group (referred to herein as "aromatic monomers") has been found to improve weatherability to a greater extent. Ethoxylated nonylphenolacrylate, Actilane 410 (aromatic monofunctional acrylate), and 2-phenoxyethyl acrylate are suitable aromatic monomers. Optionally, the ink comprises from 5 to 25%, more preferably from 10 to 25% and optionally from 15 to 25%, of the aromatic monomer.

Advantageously, the compositions of the substrate and the jet ink are such that the substrate is swellable by the jet ink. Swelling of the substrate upon contact with the ink jet ink is believed to promote the adhesion of the dried or cured ink jet ink to the substrate.

Assessment of whether or not a jet ink is suitable for swelling a substrate may be carried out as follows: i) wipe a layer of the coloured jet ink onto the substrate; ii) leave the whole for a time period (e.g. 60 seconds); and iii) wipe the ink off. If the area which was in contact with the ink shows a change in colouration, the jet ink has swollen the substrate.

Ink compositions which are suitable for swelling a certain substrate may be arrived at by including in the ink one or more monomers which swell that substrate and therefore the ink preferably comprises a monomer which is suitable for swelling the substrate. Monomers that are suitable for swelling polyvinyl chloride include tetrahydrofurfuryl acrylate, 1,6-hexane diol diacrylate, and N-vinyl-2-caprolactam as well as CTFA. Optionally, the ink comprises between 5 and 25%, for example, between 10 and 25%, by weight of substrate swelling monomer or monomers, other than CTFA.

In one embodiment, the ink comprises no more than 20%, more preferably less than 5% by weight of high Tg monomers. The term 'high Tg monomers' refers to monomers, the homopolymers of which have a Tg (glass transition temperature) of at least 50° C. The presence of such high Tg monomers is believed to lower the flexibility of the cured ink. Optionally, the ink comprises less than 10%, preferably less than 5% by weight of high Tg monofunctional monomers.

The ink of the invention may be a colourless ink which can be used, for example, as an overcoat coating, varnish or other colourless coating. In an alternative embodiment, the ink comprises a colourant which may be a dye or pigment. Preferably, the colourant is a pigment. The pigment may be organic or inorganic. The ink optionally comprises from 0.1 to 20% by weight, preferably from 1 to 8% by weight and more preferably from 3 to 6% by weight of an organic pigment, for example, an azo pigment. The ink optionally comprises from 1 to 20% by weight, preferably from 5 to 18% by weight of an inorganic pigment, for example a metal oxide pigment.

One known way of formulating inks with high flexibility is to include in the ink a plasticizers, such as a phthalate ester. The present inventors have found that it is possible to formulate inks according to the invention with good flexibility even in the absence of or using only low levels of plasticizer. In one embodiment, therefore, the ink comprises no more than 5% by weight, preferably no more than 2% by weight of plasticizer, and is optionally substantially free of plasticizers.

In a further aspect of the invention, there is provided a radiation-curable ink jet ink which comprises at least 50% by weight of cyclic trimethylolpropane formal acrylate (CTFA), a free-radical photoinitiator and no more than 5% by weight of plasticizer.

The ink of the invention will comprise one or more free-radical photoinitiators. In one embodiment, the ink is a UV curable ink and comprises from 0.1 to 20%, more preferably from 0.1 to 15%, especially preferably from 0.1 to 13% by weight of a free-radical photoinitiator. The term "free-radical" photoinitiator refers to a photoinitiator which provides free-radicals which initiate free-radical mediated polymerisation of suitable monomers. Any suitable free-radical photoinitiator can be used, for example, suitable benzophenones, thioxanthones, phosphine oxides, α-hydroxy ketones and α-hydroxy amino ketones. Many suitable free-radical photoinitiators are known to the skilled person.

Preferably, the ink is such that it can be substantially fully cured, in use, by a UV source delivering a dose of less than 400 mJ/cm$^{-2}$, more preferably less than 250 mJ/cm$^{-2}$ and optionally less than 100 mJ/cm$^{-2}$, for an 8 μm thick layer.

Ink jet printing requires inks of low viscosity. Preferably, the ink jet ink of the invention has a viscosity of less than 30 mPas at 50° C., more preferably less than 20 mPas at 50° C., optionally less than 10 mPas at 50° C.

The invention also provides a method of ink jet printing, comprising the steps of i) ink jet printing an ink according to the invention onto a substrate and ii) exposing the ink to UV-radiation so as to cure the ink.

Advantageously, the substrate has a thickness of at least 0.2 mm.

Advantageously, the substrate has a thickness of less than 2 mm.

Advantageously, the substrate is a flexible substrate. The term "flexible substrate" as used herein is one which can be folded 180° C. back upon itself and pinched together so that the faces of the material meet at a distance of 3 mm from the fold line without cracking (regardless of cracking of any ink on the surface of the substrate) and without showing permanent deformation.

The substrate may be a rigid substrate and the method may include the further step of deforming the substrate and the at least partially cured image, for example, by vacuum forming. Products made by such processes include point of sale displays and advertising items.

Advantageously, the temperature of the printer head is 60° C. or lower, more preferably 50° C. or lower.

The invention also provides an ink jet printer containing an ink according to the invention.

The invention also provides a printed object comprising a substrate having on at least one surface the cured product of an ink according to the invention.

All percentages used herein are by weight based on the total weight of the ink unless another meaning is clear from the context.

Examples of the invention will now be described for the purposes of illustration only.

Cure Speed

The cure speed was assessed as follows:

Drawdowns were made on samples of low odour polyester substrate—Folanorm, (obtained from Folex, United Kingdom) measuring 120 mm by 80 mm. The drawdowns were made on the RK printcoat KCC 101 automated drawdown rig, with a No. 3 K-Bar. (12 μm rated.)

The drawdowns were then immediately passed through a Fusion LC6E laboratory conveyor unit with a F300S lamp system fitted with a medium pressure mercury lamp (120 W/cm.) The drawdowns received single doses of 100 mJ/cm$^2$, and the cured film was assessed after each 100 mJ/cm$^2$ to see if the film has cured. (The dose was measured with an International Light IL 390 C UV dose meter.) The film was considered to have cured if the ink layer was no longer wet, and the ink film could not be broken through to the substrate by rubbing the surface five times with the ball of a gloved index finger.

The total dose received was calculated from adding the individual doses. If greater than one dose of 100 mJ/cm$^2$ was required, the answer to Acceptable Cure Speed at 100 mJ/cm$^2$ in Table 3 was recorded as 'No'.

Flexibility

The flexibility was assessed as follows:

Drawdowns were made on a flexible reinforced vinyl substrate—Dickson Jet 620 from Dickson—measuring 120 mm by 80 mm. The drawdowns were made on the RK printcoat KCC 101 automated drawdown rig, with a no. 3 K-Bar. (12 μm rated.)

The drawdowns were then immediately passed through a Fusion LC6E laboratory conveyor unit with a F300S lamp system fitted with a medium pressure mercury lamp (120 W/cm.) The drawdowns received cure doses of 300 mJ/cm$^2$. Next, a second layer of ink was drawn down over the first cured layer, using the same drawdown and cure procedure described above. The drawdowns were then left for 30 minutes.

This 'double layer' was then assessed for flexibility. On the reinforced vinyl substrate, the flexibility was measured by taking opposite corners of the printed rectangles, and folding them to form a rectangle half of the original size, with the ink layer on the outside, bringing the two inside faces in contact with each other with finger pressure, at a decreasing distance from the fold line, until the inside faces are in contact with each other at a distance equal to, and not less than 3 mm from the fold line.

The folded vinyl sheet was then held in this position for 5 seconds. The level of ink cracking on the fold was then assessed visually, (whilst still being held folded). The level of white area, showing the substrate underneath, was used as a measure of the level of cracking. Less white area showed that there was less cracking. The presence or absence of white area was recorded.

A pass was recorded if no cracking was seen on the fold/bend. A fail was given if white areas, showing the substrate below, were seen.

Adhesion

The adhesion was assessed as follows:

Drawdowns were made on a self adhesive vinyl substrate.—Fascal 900 from Avery—measuring 120 mm by 80 mm. The drawdowns were done on the RK printcoat KCC 101 automated drawdown rig, with a no. 3 K-Bar. (12 μm rated.)

The drawdowns were then immediately passed through a Fusion LC6E laboratory conveyor unit with a F300S lamp system fitted with a medium pressure mercury lamp (120 W/cm.) The drawdowns received cure doses of 300 mJ/cm$^2$. They were then left for 30 minutes.

Cross hatch adhesion tests (ASTM D 3359) were then performed using a scalpel and a severe adhesion test tape. (Cellulose Splice Tape Red No 139. Code No 1112 25 mm×66 mm 3 inch core, Swiss Quality from Scapa Tapes.) The level of ink removal by the tape was then recorded with reference to the ASTM 3359 assessment protocol.

COMPARATIVE EXAMPLE 1

Odour Level of Cured Films of Currently Commercially Available UV-Curable Jet Inks Three commercially available inks were tested to assess their level of odour.

Drawdowns were made on samples of a low odour polyester substrate—Folanorm (obtained from Folex, United Kingdom) measuring 120 mm by 80 mm. The drawdowns were made on an RK Printcoat KCC 101 automated drawdown rig, with a No. 3 K-Bar. (12 μm rated.) The drawdowns were then immediately passed through a Fusion LC6E laboratory conveyor unit with a F300S lamp system fitted with a medium pressure mercury lamp (120 W/cm). The drawdowns received 300 mJ/cm$^2$ of UV radiation, measured by an International Light IL 390 C UV dose meter. As a control the same dose was given to a sample of the Folanorm substrate which did not have an ink layer.

10 seconds after curing each cured drawdown was cut down to a size of 120 mm by 40 mm and it was placed in a clean glass jar of dimensions 60 mm diameter and 60 mm depth and the top was then screwed on. Six of these odour test jars were prepared for each cured ink, and six for the uncoated Folanorm, and when all were completed the glass jars were placed in an oven at 40° C. for 16 hours.

The following odour test was then performed.

An odour test panel was assembled of six people not exposed to ink jet material odours in their everyday work.

Each testing person was then presented with a set of jars containing one of each of the cured samples or the Folanorm blank in a random order. They removed the lid, and smelt the air in the jar. They were then asked to rate the odour level on the following scale.

| Odour Level | Score |
| --- | --- |
| Very Strong | 6 |
| Strong | 5 |
| Moderate | 4 |
| Perceptable | 3 |
| Barely | 2 |
| None | 1 |

The person then repeated the odour assessment on the other ink drawdowns in the other jars in their set.

The next person repeated the odour assessment on the other jars. The process was repeated for the six people on the panel and results were recorded. The six scores were then averaged for each ink/irradiated substrate. Results are given in Table 1.

TABLE 1

Comparative Odours of Commercially Available UV Jet Inks.

| Ink Supplier | Ink Code | Colour | Odour |
| --- | --- | --- | --- |
| Sunjet | Crystal UFE 5597 | Cyan | 4.7 |
| Sericol | Uvijet Cyan | Cyan | 4.0 |
| 3M | PressVu UV | Cyan | 4.3 |
|  | Folanorm Control | — | 1.7 |

EXAMPLE 2

Formulation of a Low Odour UV Jet Ink

TABLE 2

| Material | Ink A | Ink B | Ink C | Ink D | Ink E | Ink F | Ink G |
| --- | --- | --- | --- | --- | --- | --- | --- |
| Cyclic trimethylolpropane formal acrylate (CTFA) | 80.5 | 60.5 | 60.5 | 40.5 | 40.5 | 40.5 | 20.5 |
| Vinyl Caprolactam | 0.0 | 0.0 | 10.0 | 0.0 | 10.0 | 0.0 | 10.0 |
| Tridecyl Acrylate | 3.0 | 3.0 | 3.0 | 3.0 | 13.0 | 23.0 | 13.0 |
| Phenoxy Ethyl Acrylate | 0.0 | 20.0 | 0.0 | 40.0 | 0.0 | 0.0 | 0.0 |
| Propoxylated Neopentyl Glycol Diacrylate | 0.0 | 0.0 | 10.0 | 0.0 | 20.0 | 20.0 | 40.0 |
| Aliphatic polyester urethane diacrylate resin | 3.0 | 3.0 | 3.0 | 3.0 | 3.0 | 3.0 | 3.0 |
| 1-hydroxycyclohexyl phenyl ketone | 2.0 | 2.0 | 2.0 | 2.0 | 2.0 | 2.0 | 2.0 |
| Bis (2,4,6-trimethylbenzoyl)-phenylphosphineoxide | 6.0 | 6.0 | 6.0 | 6.0 | 6.0 | 6.0 | 6.0 |
| Surfactant (MegafaceFC430) | 0.3 | 0.3 | 0.3 | 0.3 | 0.3 | 0.3 | 0.3 |
| Black Pigment PB 7 | 3.0 | 3.0 | 3.0 | 3.0 | 3.0 | 3.0 | 3.0 |
| Dispersant from Avecia (Solsperse 32000) | 2.2 | 2.2 | 2.2 | 2.2 | 2.2 | 2.2 | 2.2 |
| Viscosity: | 12.1 mPa s @50 C. | 10.1 mPa s @50 C. | 10.9 mPa s @50 C. | 9.9 mPa s @50 C. | 11.8 mPa s @50 C. | 12.4 mPa s @50 C. | 11.2 mPa s @50 C. |

EXPERIMENTAL

Inks A to G were prepared to the formulation above. (The pigment was bead milled with the dispersant and 20% of the cyclic trimethylolpropane formal acrylate.) The viscosity was measured using a Brookfield LV DV-III Viscometer, with water jacket, and a No. 18 spindle.

Odour tests were carried out as described in Comparative Example 1. Cure speed, flexibility and adhesion tests were then carried out. Results are given in Table 3.

TABLE 3

Results on Low Odour UV Jet Ink versus a Commercially Available Ink.

| Ink | Odour (5 = Strong) 2 = Barely Detectable) | Flexibility (2 × 12u) | Acceptable Cure Speed? i.e. cured at 100 mJ/cm2? | ASTM D3359 Adhesion (5B = No Removal) (0B = >65% Removal) |
| --- | --- | --- | --- | --- |
| Standard - UFE 5597 | 4.7 | Pass | Yes | 5B |
| Ink A | 2.8 | Pass | Yes | 5B |
| Ink B | 3.0 | Pass | Yes | 5B |
| Ink C | 4.7 | Pass | Yes | 5B |
| Ink D | 3.3 | Pass | No | 2B |
| Ink E | 4.7 | Fail | Yes | 3B |

TABLE 3-continued

Results on Low Odour UV Jet Ink versus a Commercially Available Ink.

| Ink | Odour (5 = Strong) 2 = Barely Detectable) | Flexibility (2 × 12u) | Acceptable Cure Speed? i.e. cured at 100 mJ/cm2? | ASTM D3359 Adhesion (5B = No Removal) (0B = >65% Removal) |
|---|---|---|---|---|
| Ink F | 2.8 | Fail | No | 0B |
| Ink G | 4.7 | Fail | Yes | 2B |

What is claimed is:

1. A radiation-curable ink jet ink comprising at least 50% by weight of cyclic trimethylolpropane formal acrylate (CTFA), and further comprising a free-radical photoinitiator, and which is substantially free of volatile compounds.

2. An ink jet ink as claimed in claim 1 comprising at least 60% by weight of CTFA.

3. An ink jet ink as claimed in claim 2 comprising at least 70% by weight of CTFA.

4. An ink jet ink as claimed in claim 1 which also comprises no more than 25% by weight of a tri- or higher functional monomer(s).

5. An ink jet ink as claimed in claim 1 which comprises no more than 10% by weight of a penta- or hexafunctional monomer(s).

6. An ink jet ink as claimed in claim 1 which comprises no more than 5% by weight of a di- or higher functional monomer or monomers.

7. An ink jet ink as claimed in claim 1 comprising from 0.1 to 25% by weight of a colorant.

8. An ink jet ink as claimed in claim 1 which comprises from 0.1 to 20% by weight of a UV free-radical photoinitiator.

9. An ink jet ink as claimed in claim 1 having a viscosity of less than 30 mPas at 50° C.

10. A radiation-curable ink jet ink which comprises at least 50% by weight of cyclic trimethylolpropane formal acrylate (CTFA) and which also comprises a free radical photoinitiator, and wherein di- or higher functional monomers, if present, in total account for no more than 5% by weight of the ink.

11. A radiation-curable ink jet ink which comprises at least 50% by weight of cyclic trimethylol propane formal acrylate (CTFA), which also comprises a free-radical photoinitiator, and wherein plasticizers, if present, in total account for no more than 5% by weight of the ink.

12. A radiation-curable ink jet ink which comprises at least 50% by weight of cyclic trimethylolpropane formal acrylate (CFTA), at least one di- or higher functional monomer, and a free radical photoinitiator.

13. An ink jet-ink as claimed in claim 12 which comprises less than 1% by weight of volatile compounds.

14. An ink jet printer containing an ink as claimed in claim 1.

15. A printed object comprising a substrate having on at least one surface the cured product of an ink according to claim 1.

16. A method of ink jet printing comprising the steps of i) ink jet printing an ink as claimed in claim 1 onto a substrate and ii) exposing the ink to UV-radiation so as to cure the ink.

17. A method as claimed in claim 16 in which the substrate is non-porous.

18. A method as claimed in claim 16 in which the substrate is a flexible substrate.

19. A method as claimed in claim 16 in which the cure does is no more than 400 mJ/cm$^{-2}$.

* * * * *